May 12, 1931.   G. B. CROUSE   1,804,859
FILTERING ELECTRIC CURRENTS
Filed Dec. 12, 1923   2 Sheets-Sheet 1
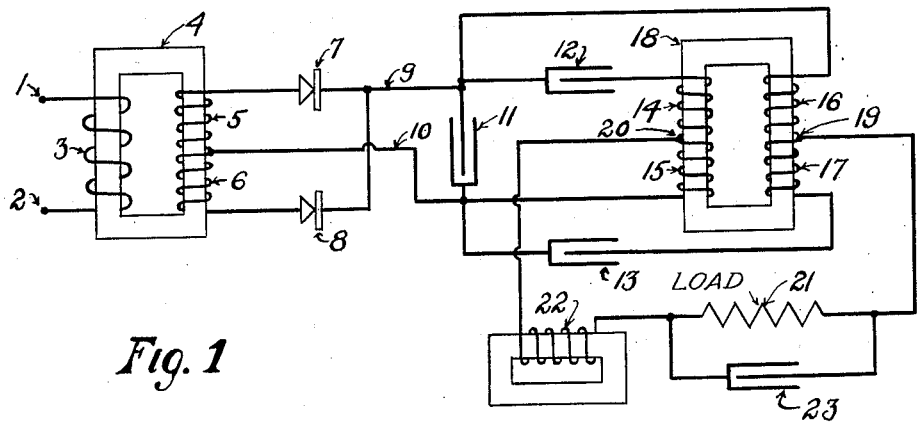
Fig. 1
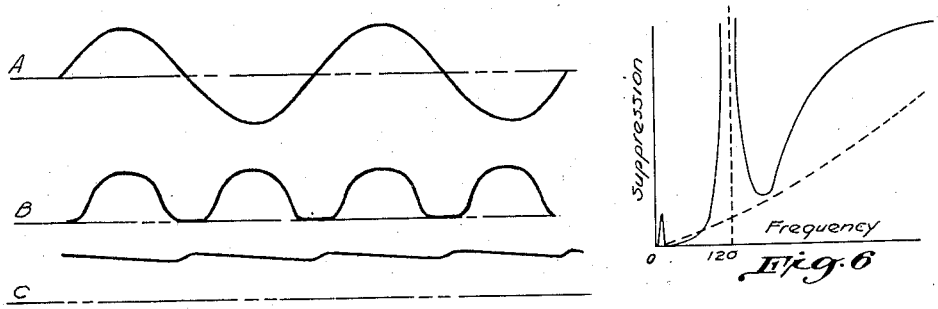
Fig. 2
Fig. 6
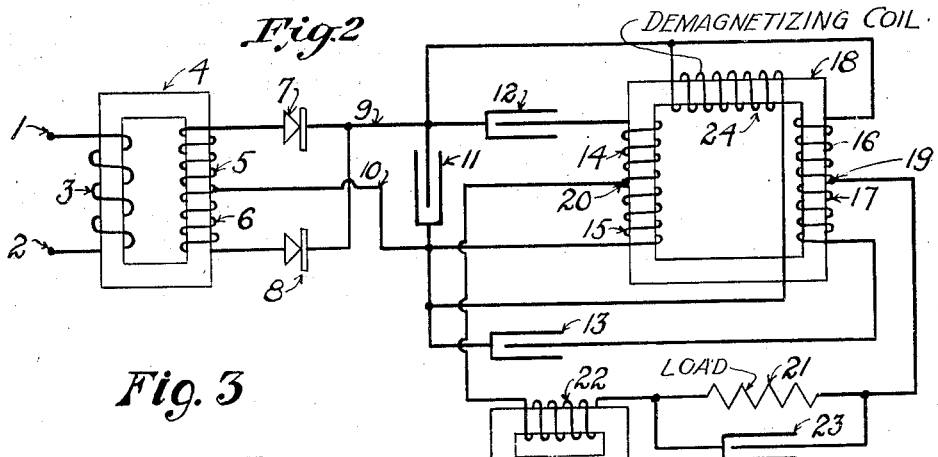
Fig. 3
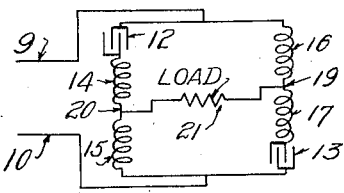
Fig. 5
INVENTOR
George B. Crouse
BY Walter J. Gill
ATTORNEY May 12, 1931.  G. B. CROUSE  1,804,859
FILTERING ELECTRIC CURRENTS
Filed Dec. 12, 1923   2 Sheets-Sheet 2

INVENTOR
George B. Crouse,
BY Walter J. Gill
ATTORNEY

Patented May 12, 1931

1,804,859

UNITED STATES PATENT OFFICE

GEORGE B. CROUSE, OF STAMFORD, CONNECTICUT, ASSIGNOR, BY MESNE ASSIGNMENTS, TO CONNER CROUSE CORPORATION, OF NEW YORK, N. Y., A CORPORATION OF NEW YORK

FILTERING ELECTRIC CURRENTS

Application filed December 12, 1923. Serial No. 680,096.

This invention relates to filtering electric currents, and more particularly to the separation from a direct current supply of all alternating current components or ripples.

There are many devices which require for their satisfactory operation a source of direct current which is absolutely free from all alternating current components or short period variations.

A device of this character in which the requirements are particularly severe, is the modern radio receiver, employing audion tubes as detectors and amplifiers. Not only are two such sources of electrical energy required for the operation of the audion (i. e., one for heating the hot cathode and one for supplying the thermionic current) but any short period variation of the supply, which might not be objectionable in a single tube, is amplified many hundreds of times if several tubes are employed in cascade. There are also other difficulties which will be mentioned later.

Heretofore it has been the practice to supply the power for operating the audions in a radio receiver from primary or secondary batteries, as being the only practical means for obtaining electrical energy of the requisite smoothness. The disadvantages of a battery for this purpose are many. If secondary batteries are employed, the strongly corrosive electrolytes required cause damage to furniture and floor coverings, and the necessity of continually recharging is troublesome, in addition to which the life of the battery is comparatively short. If dry batteries are employed, their life is short, and the expense of maintenance is high.

It has therefore been obvious to inventors for some time that some means of operating a radio receiver directly from the usual A. C. lighting mains would be very desirable, and numerous attempts have been made to accomplish this purpose. For instance, in Patent No. 1,432,022, granted on October 17, 1922 to R. A. Heising, means for operating the filaments of audions on alternating current is disclosed. In this method, the filaments are lighted from alternating current without rectification, and the grid is connected to the middle point of the filament, either directly or through an external potentiometer. I have found that this method is unsatisfactory for a radio receiver, due to the fact that the amplifying characteristics of the audion are different at different potentials between the grid and filament. Therefore that half of the filament which at any moment is negative with respect to the grid is not exactly balanced by the positive half, with resulting noise in the output of the receiver and troublesome modulation of the received signal.

It has been proposed to rectify the alternating current, and then to smooth out the resulting fluctuation by means of electrical wave filters, of the general type disclosed by G. A. Campbell in Patent No. 1,227,113, granted on May 22, 1917. I have found that filters of this type, to be even reasonably satisfactory, require impractically large inductances and condensers.

Still another method which has been proposed is that shown in Patent No. 1,411,814 granted to H. M. Stoller, on April 4, 1922. This method employs a motor generator, for generating direct currents of the requisite voltages. It has long been known that a generator is not a satisfactory means of supplying energy to an audion, due to the ripples caused by the commutation, and to remedy this, Stoller uses a modified form of wave filter, in which only inductances and resistances are employed. This method is reasonably satisfactory for the purpose for which it was designed, which was to receive spark signals on an aeroplane. However, the resulting noise and modulation with this system, make it totally unsuitable for receiving very weak signals, or for radio telephone reception.

An object of this invention is to provide economical and efficient apparatus for the substantially complete suppression of all alternating components present in a source of rectified current. A further object is to provide an electrical network for use between an audion circuit and a direct current source containing alternating components, which network permits the transmission of direct current but offers a substantial impedance to all alternating components and a maximum impedance at the frequency of the most disturbing alternating component of the source.

More specifically an object is to provide an electrical network of the type stated, and in which the impedance elements are arranged as an alternating current Wheatstone bridge across which the source of current and the audion circuit are connected as conjugate arms.

In the following specification, I have described one embodiment of my invention, in which these objects as well as others which will hereinafter appear, are attained by causing the current to be filtered to flow in parallel paths and connecting the load circuit across these paths at points of substantially equal alternating current potential but of unequal direct current potential.

Otherwise defined, the alternating current components are caused to flow in parallel paths around the load circuit and the direct current is caused to flow through a portion of each of the paths and the load circuit.

While in the following disclosure, I have described a particular application of the invention to a radio receiving set employing audion tubes, as such an application represents the most severe requirements with which I am familiar, the invention is not limited to this use, but is equally applicable to any case requiring a source of direct current free from ripples, or short period disturbances.

Referring to the drawings which form a part of this specification,

Fig. 1 is an electrical diagram showing the general principles of the invention, Fig. 2 shows the potential characteristics obtaining at various points of the circuit of Fig. 1.

Fig. 3 is an electrical diagram showing a modification of the invention suitable for large currents.

Fig. 5 represents in simplified form, some of the elements of Fig. 1.

Fig. 6 is a graphic illustration of the suppression characteristics of the filter network.

Figure 4:
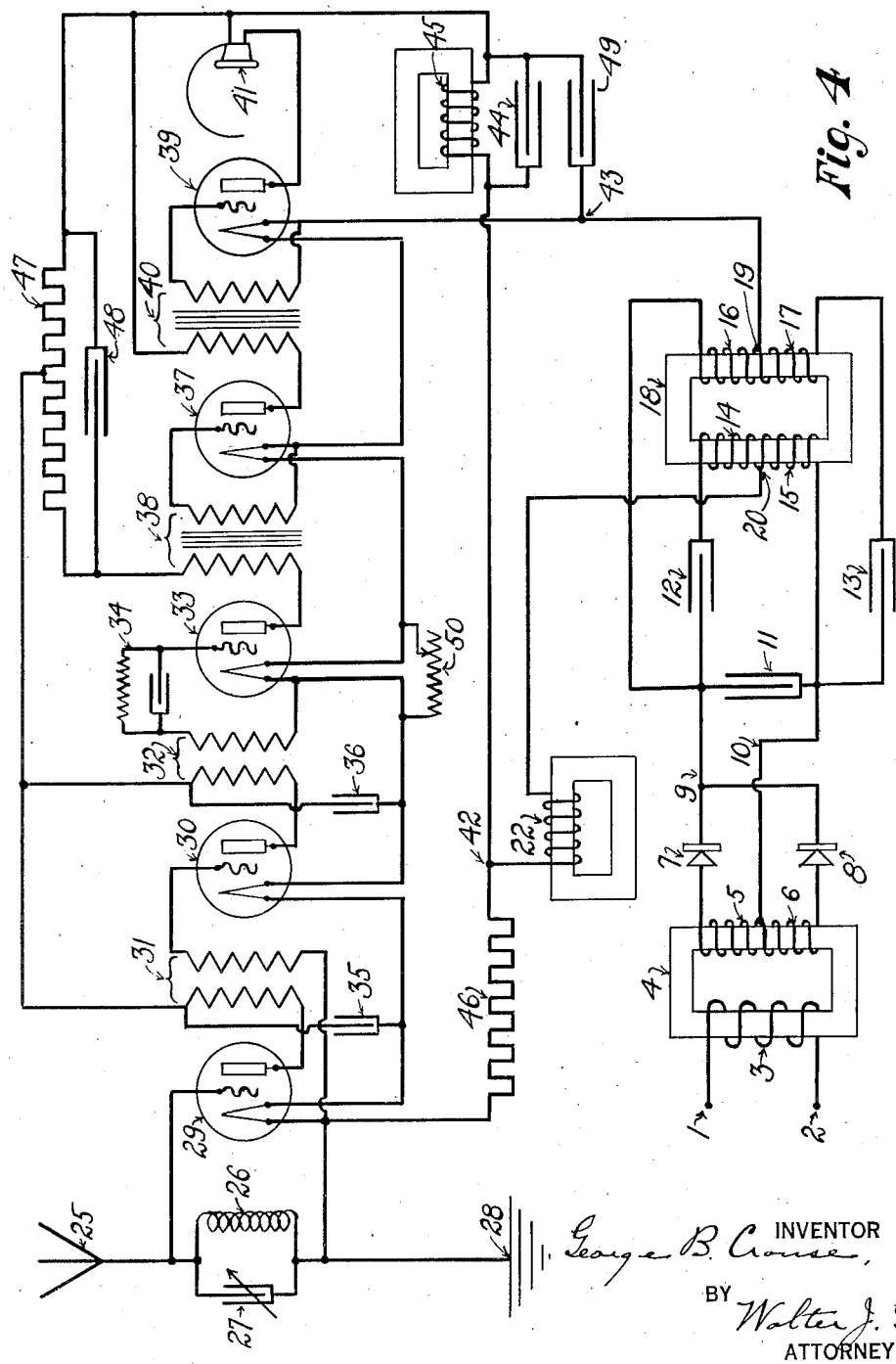
Fig. 4 is an electrical diagram showing the invention applied to a radio receiver.

The general principle of the invention may best be understood by reference to Fig. 1. In this figure, I have shown the direct current supply as derived from the rectification of alternating current, as for instance 60 cycle current as ordinarily supplied for light and power. 1 and 2 are the terminals which are connected to such a source of supply. 3 is the primary winding of a transformer having an iron core 4, and two secondary windings, 5 and 6, having an equal number of turns and connected in series as shown. 7 and 8 represent two rectifiers, which may be of any type suitable to the voltage and current requirements of the load demand. The outer terminals of the rectifiers are connected together to the wire 9, to form one side of the rectified supply, the other side being obtained by a connection 10 to the inside connection of the secondaries, 5 and 6. With this arrangement alone, there will be delivered to the conductors 9 and 10 a pulsating undirectional potential, as shown at B, Fig. 2, A in this figure showing the voltage applied at the input terminals 1 and 2, Fig. 1.

Now by the addition of an electrostatic condenser 11, connected across the conductors 9 and 10, the voltage characteristic available for the load circuit is changed to approximately that shown at C, Fig. 2 due to the storing action of the condenser. Such a voltage curve contains a direct current component, upon which is superimposed an alternating voltage containing in general a large number of different frequencies, the lowest frequency being twice the frequency of the primary supply voltage, provided that the rectifiers 7 and 8 have equal rectifying properties under load.

Such a voltage supply is totally unsuitable for application to such devices as audion tubes for either transmitting or receiving radio telegraph or telephone messages. In order to separate all of these alternating current disturbances from the direct current component, I cause the current to flow through two parallel paths, one path comprising the condenser 12 and the inductances 14 and 15 and the other path comprising the inductances 16 and 17 and the condenser 13, as shown in simplified form in Fig. 5. In practice these four inductances are preferably all wound on the same iron core 18 and in such a direction that their mutual inductances reinforce their self inductances.

It will be apparent from a consideration of this diagram, that the effect of the condensers 12 and 13 will be to offset a portion of the inductance of the coils 14 and 17 respectively, and that therefore, if we suitably increase the inductance of these two coils over that of the coils 15 and 16, we may obtain at the junction points 19 and 20, equal and opposite potentials for any particular frequency. In practice, I prefer to design the circuit to obtain equal potentials at a frequency of twice the supply frequency. By employing comparatively large values of the condensers 12 and 13, this equality of potential will not only be obtained for the double frequency component, but to a large extent also for all higher frequencies, leaving only a very small percentage of these higher frequencies between the points 19 and 20.

In order to illustrate this numerical values may be assigned to the constants of the circuit. Suppose that the coils 15 and 16, are of 10 henries value, their reactance in ohms, given by the formula $$X_1 = 2\pi f L$$

is approximately 7,500 ohms at $f=120$ cycles. Assume the condensers 12 and 13 to have a value of 10 microfarads each. Their reactance at 120 cycles, given by the formula $$X_c = \frac{1}{2\pi f C}$$

will be approximately 130 ohms. Then in order to obtain equal potentials at this frequency, it will be necessary to make the inductive reactance of the coils 14 and 17, 7,500 ohms + 130 ohms = 7,630 ohms.

As the frequency is increased, the reactance of the condensers becomes smaller, and the reactance of the inductances larger, thereby producing unequal potentials at the junction points for these higher frequencies. For instance, at 240 cycles, the reactance of the condensers would be decreased 50%, or 65 ohms, the reactances of the inductances being doubled, or, for coils 15 and 16, 15,000 ohms and for coils 14 and 17, 15,260. Subtracting the condensive reactance of 65 ohms from the latter value, gives values of the arms 14 and 17 of 15,195 ohms. Therefore at a frequency of 240 cycles, the potential difference will be reduced to about 3% of its total value.

The suppression characteristic of the filter may be plotted by computing the impedances of the bridge arms at other frequencies, and it will be found that the curve has the form illustrated in full line in Fig. 6. The attenuation at the frequency of the maximum alternating component present in the rectified current, i. e., 120 cycles, will be infinite as the bridge is balanced for that frequency. The attenuation at other frequencies is, of course, less but is relatively high at all other frequencies present in the rectified current. The magnitude of such other frequencies is of an order materially lower than that of the fundamental frequency and the attenuation of the bridge circuit may effect the required suppression of such components. Where more complete elimination is desired, the attenuation characteristic may be raised by additional impedances associated with the audion circuit.

Returning again to Fig. 1, the load is connected across the points 19 and 20, the load being represented by the resistance 21. It will be apparent that all direct current will be obliged to flow across the load 21, due to the position of the condensers 12 and 13 in the parallel circuits, which causes the bridge to be unbalanced for direct current. In order to absorb the small remaining percentage of the higher frequencies which are not balanced out, I employ an inductance 22 in series with the load, and a condenser 23 in parallel with the load.

The suppression characteristic of the inductance 22 and condenser 23 has the general form of the dotted line curve of Fig. 6. The degree of suppression depends upon the values of these impedances and the load but the general characteristic of an arrangement of this type is to offer progressively higher suppression for increasing frequencies.

In order to give a clearer idea of the magnitude of the various electrical quantities which I have found to be satisfactory in practice for carrying out my invention, I will describe an actual circuit for supplying the plate current to a radio receiving set, which required 150 volts and 50 milliamperes.

In the construction of this circuit, I employed secondaries 5 and 6 giving 300 volts apiece, the rectifiers 7 and 8 being of the two element hot cathode type. Condenser 11 had a capacity of 2 microfarads. Condensers 12 and 13 were of the electrolytic type, with rated capacities of 28 microfarads each. The coils 14, 15, 16 and 17, had effective inductances (including their mutual inductances) of approximately 10 henries each. Coil 22 had about 6 henries inductance, and condenser 23 was of 1 microfarad capacity. In the particular case described, I have found that the values given above may be varied through very wide limits, without affecting the effective operation of the device, and it will therefore be understood that the invention is in no way limited to the proportions given. The proper proportion of the elements of the circuits to fit any given load demand will be apparent to anyone skilled in the art.

It is obvious that my invention as described above may be applied to smooth out the commutator ripples, when using a direct current generator as a source of supply, by merely connecting the terminals of the machine to conductors 9 and 10, in place of the transformer and rectifiers shown in Fig. 1.

In those applications where it is necessary to supply comparatively large currents at relatively low voltages, it is obvious that the large direct current flowing through the windings 15 and 16 sets up a constant flux in the core 18, which due to the partial saturation of the iron, reduces the effective inductance of the coils. In order to remedy this condition, and to reduce the size and weight of the iron core, I employ a modification as shown in Fig. 3.

In this figure, I have shown the same circuit as that of Fig. 1, with the corresponding parts identically numbered. The additional element is the coil 24, which is connected directly across the leads from the rectifier and wound on the core 18, in such a manner that the direct current which will be shunted through the coil will be in the opposite direction to the current flowing in the coils 15 and 16. In the coil 24 I employ a comparatively large number of turns, for two reasons. In the first place, I obtain the requisite number of de-magnetizing ampere turns, without the dissipation of a large amount of current. In the second place, it will be noted that whereas the direct current flowing in this auxiliary coil is usefully demagnetizing, the alternating current is also opposed to the alternating current flowing in the coils 14, 15, 16 and 17, and therefore tends to reduce the inductance of these coils, which is detrimental. By the use of a large number of turns in this auxiliary coil, in comparison with the number of turns of the main coils, the alternating current flowing in the auxiliary coil will be reduced faster than the number of turns of the coil is increased, so that the detrimental effect mentioned is minimized.

As mentioned above, the supply of electrical power to the audions of a radio receiver is a most severe requirement, since any disturbance of audio frequency is amplified many hundreds, or even thousands of times by the time it reaches the receiving telephone. In order to show how my invention may be conveniently applied to an instrument of this type reference may be had to Fig. 4, in which a complete radio receiver is shown, employing two stages of radio frequency amplification, an audion detector, and two stages of audio frequency amplification. I have selected this particular receiver circuit, as being typical of a large class of radio receivers now on the market, but the method may be applied in a similar manner to any receiver.

In Fig. 4, 25 is an antenna, 26 an inductance coil suitable for radio frequencies, 27 a variable condenser and 28 a ground connection. The antenna circuit is tuned by means of the condenser 27, to the frequency of the incoming radio signal wave in the usual manner. Two stages of radio frequency amplification are shown, with audion tubes 29 and 30. Tubes 29 and 30 are coupled by means of the radio frequency transformer 31 while tube 30 is coupled to the detector tube 33 by the transformer 32. The usual grid leak and condenser 34 are employed in the grid circuit of the detector tube. Small condensers (say .002 m. f. capacity) 35 and 36 are connected between the filament connection and the outer end of the transformer primaries, for the purpose of by-passing the radio frequency currents and thus prevent the coupling which might occur between tubes, if this radio frequency current were obliged to traverse the entire plate circuit.

Detector tube 33 is coupled to the first audio tube 37 by means of the iron core transformer 38, and in like manner, tube 37 is coupled to the second audio tube 39 by means of the transformer 40. A suitable telephone device 41 is placed in the plate circuit of the last tube.

The above description of the radio set is merely given to make the diagram clear, since circuits of this type are well known to those familiar with the art.

Turning now to the power supply circuit, this circuit up to the terminals 42 and 43 is identical with that shown in Fig. 1, the corresponding parts are identically numbered and the manner in which current is supplied to the audions is obvious from the preceding description.

It will be noted from Fig. 4 that I prefer to place all of the audion filaments in series. This is not essential to the application of my invention, but it has the advantage that only one set of rectifiers and filters is required, which usually offsets the disadvantage of the slightly lower efficiency of the arrangement. I find that a series arrangement of filaments works fully as well as the usual parallel arrangement.

Referring again to the diagram Fig. 4, I sometimes find it desirable, particularly if it is required to operate the receiver with a head set instead of a loud speaker, to employ an anti-resonant circuit in the plate circuit, consisting of the condenser 44 and the inductance 45, the values being designed to make the circuit anti-resonant at, usually, twice the frequency of the power supply.

For the purpose of absorbing the additional voltage in the filament circuit, the resistance 46 is employed. 47 is a resistance for the purpose of regulating the plate voltage to the detector tube and the radio frequency tubes, and may be made adjustable if desired. This resistance is shunted by the condenser 48 to prevent intertube coupling and also loss of efficiency in the detector tube plate circuit. The condenser 49 is employed for the same purpose. An adjustable resistance 50 is placed around the filament of the tube 33 to control its brilliancy, this being desirable on a detector tube.

Should it be desirable or necessary to bias the grids of any of the amplifier tubes, it is only necessary to connect the grid connection to a suitable point on the filament circuit, since the supply is quite enough to make the use of a separate biasing battery unnecessary.

Various combinations and modifications of the above arrangements will readily suggest themselves to those familiar with the art, to suit any particular requirements of load conditions.

I claim:—

1. A filter network for use between a source of rectified current and an audion circuit, said network comprising impedances forming a plurality of elementary circuits between the input terminals and output terminals of the network, said elementary circuits cooperating to pass direct current through the audion circuit and to by-pass alternating components about the audion circuit, two of said elementary circuits each including an inductance, and mutual inductance between said inductances.

2. In apparatus for energizing an audion circuit from a source of rectified current, a filter having a pair of input terminals for connection to said source, a pair of output terminals for receiving connections from the audion circuit, and an impedance network between said pairs of terminals, said network comprising circuit elements connecting the respective terminals of said pairs of terminals to provide a series path for supplying direct current from said source to said circuit, and means cooperating with said circuit elements of the direct current path to suppress the transmission of alternating currents from said source to said audion circuit and to effect a maximum suppression at a frequency in the lower range of the alternating components present in the rectified current.

3. In apparatus for energizing an audion circuit from a source of rectified current, a filter having a pair of input terminals for connection to said source, a pair of output terminals for receiving connections from the audion circuit, and an impedance network between said pairs of terminals, said network comprising circuit elements connecting the respective terminals of said pairs of terminals to provide a series path for supplying direct current from said source to said circuit, and means cooperating with said circuit elements of the direct current path to suppress the transmission of alternating currents from said source to said audion circuit and to effect a maximum suppression at the frequency of the most disturbing alternating component present in the rectified current.

4. In apparatus for energizing an audion circuit from a source of rectified current, a filter having a pair of input terminals for connection to said source, a pair of output terminals for receiving connections from the audion circuit, and an impedance network between said pairs of terminals, said network comprising circuit elements connecting the respective terminals of said pairs of terminals to provide a series path for supplying direct current from said source to said circuit, and means cooperating with said circuit elements of the direct current path to suppress the transmission of alternating currents from said source to said audion circuit and to effect a maximum suppression as the frequency of the maximum alternating component present in the rectified current.

5. In apparatus for energizing an audion circuit from a source of rectified current, a filter having a pair of input terminals for connection to said source, a pair of output terminals for receiving connections from the audion circuit, and an impedance network between said pairs of terminals, said network comprising circuit elements connecting the respective terminals of said pairs of terminals to provide a series path for supplying direct current from said source to said circuit, and means cooperating with said circuit elements of the direct current path to suppress the transmission of alternating currents from said source to said audion circuit and to effect a maximum suppression at the frequency of the maximum alternating component present in the rectified current and a high suppression at all harmonics thereof.

6. In apparatus for energizing an audion circuit from a source of rectified current, a filter having a pair of input terminals for connection to said source, a pair of output terminals for receiving connections from the audion circuit, and an impedance network between said pairs of terminals, said network comprising circuit elements connecting the respective terminals of said pairs of terminals to provide a series path for supplying direct current from said source to said circuit, and means co-operating with said circuit elements of the direct current path to suppress the transmission of alternating currents from said source to said audion circuit and to effect a maximum suppression at a predetermined finite frequency and a high suppression at all frequencies present in the rectified current.

7. An apparatus for energizing an audion circuit from a source of alternating current, a full wave rectifier, a filter having a pair of input terminals for connection to said full wave rectifier, a pair of output terminals for receiving connections from the audion circuit, and an impedance network between said pairs of terminals, said network comprising circuit elements connecting the respective terminals of said pairs of terminals to provide a series path for supplying a direct current from said source to said circuit, and means cooperating with said circuit elements of the direct current path to suppress the transmission of alternating currents from said source to said audion circuit and to effect the maximum suppression at double the frequency of the source of alternating current.

8. In apparatus for energizing an audion circuit from a source of alternating current, a rectifier, a filter mesh for suppressing alternating components passed by said rectifier and having output terminals across which said circuit may be connected, and means between said output terminals and said circuit for suppressing residual alternating components passed by said filter mesh, said filter mesh and said means having substantially different frequency-suppression characteristics.

9. In apparatus for energizing an audion circuit from a source of rectified current, a plurality of impedances providing the four balancing arms of an alternating current Wheatstone bridge, the junctions of said arms providing pairs of terminals for connection to said audion circuit and to said source respectively, and the impedances of said arms being so related that the bridge is substantially balanced for the frequency of the most disturbing alternating component of said source and is unbalanced for direct current.

10. In apparatus for energizing an audion circuit from a source of rectified current, a plurality of impedances serially arranged as the four balancing arms of a Wheatstone bridge having conjugate pairs of junction points serving as the terminals for said audion circuit and said source, respectively, the two alternative paths through said circuit provided by the pairs of non-adjacent arms being one conductive and the other substantially non-conductive for direct current, and the impedances of the arms being so related that the bridge is substantially balanced for the frequency of the maximum alternating current component of said source.

11. In apparatus for energizing an audion circuit from a source of rectified current, impedances providing parallel alternating current paths between two input terminals to which said source may be connected, output terminals located at intermediate points in the respective paths for connection to the audion circuit, the impedances of the four portions into which said paths are divided by said four terminals being such that the network functions as a Wheatstone bridge substantially balanced at the frequency of the maximum alternating component of said source current, the bridge arm provided by one of said four portions being non-conductive for direct current.

12. Apparatus for preventing the alternating components of a source of rectified current from traversing an audion circuit comprising a plurality of impedances forming an alternating current Wheatstone bridge having said source and said circuit arranged as the conjugate arms thereof, said impedances being so proportioned that the bridge is substantially balanced at the frequency of the alternating component which causes the greatest disturbance in the audion circuit.

13. In apparatus for filtering current supplied from a source to a load circuit, impedance elements arranged as a Wheatstone bridge capable of being balanced for alternating currents, two impedance elements comprising non-adjacent balancing arms of said bridge being provided by inductances, the impedance elements of the other two non-adjacent arms being composite and comprising inductance and capacity in series, and a core of magnetic material common to the inductances of all of said balancing arms, the respective conjugate pairs of junction points of said arms serving as terminals for the source and the load circuit, respectively.

14. An electrical filter for use between an audion circuit and a source of direct current having alternating components, said filter comprising four impedances serially connected as the four balancing arms of a Wheatstone bridge, two non-adjacent arms being conductive, and the other two non-adjacent arms being substantially non-conductive for direct currents, the conjugate pairs of junction points of said arms serving as terminals for said audion circuit and said source, respectively.

15. In apparatus for energizing an audion circuit of a radio receiver from a source of direct current having alternating components, impedances providing parallel alternating current paths between two terminals to which said source may be connected, each of said paths comprising conductive and non-conductive elements in series and the non-conducting elements in the two paths being reversely arranged, and terminals for the load circuit at intermediate points in the respective paths which are of substantially equal alternating current potential but of unequal direct current potential.

16. Means for supplying the audions of a raido receiver with rectified current free from alternating components, comprising a circuit including a plurality of parallel paths and means for connecting the filaments of the audions in series between the paths at points of substantially equal and simultaneous alternating current potential, but of unequal direct current potential.

17. In apparatus for supplying the filament and plate circuits of a plurality of audions from an alternating current supply, a rectifier for converting alternating current from said supply into direct current having alternating components, a filter network energized by said rectifier output and comprising a plurality of impedances proportioned and related to suppress said alternating components, means for connecting the filaments of the audions in series between points in said network which are at different direct current but substantially equal alternating current potentials, and means for energizing the plate circuits of said audions from said network.

18. In apparatus for supplying the filament and plate circuits of a plurality of audions from an alternating current supply, a rectifier for converting alternating current from said supply into direct current having alternating components, a filter network energized by said rectifier output and comprising a plurality of impedances proportioned and related to suppress said alternating components, said network having output terminals across which there exists a direct current potential of the order required for energizing the plate circuits, and means including a resistance for connecting the filaments of said audions in series across said output terminals.

19. In a system for supplying the audions of a radio receiver from an alternating current supply, the combination of means for rectifying the alternating current, a condenser connected across the rectified output circuit, a Wheatstone bridge in parallel with the condenser and substantially balanced for alternating current but unbalanced for direct current, means for connecting the audion circuits between the points of substantially equal alternating current potential but of unequal direct current potential whereby only direct current free from short period variations will flow therethrough, an inductance in series with said connecting audion circuits and a condenser in parallel with the means.

20. In apparatus for filtering direct current containing alternating components to obtain smooth direct current, an iron core, a plurality of coils wound on the core and constituting the arms respectively of a Wheatstone bridge and condensers in series with the coils of one pair only of opposite arms of the bridge.

21. In apparatus for filtering direct current containing alternating components to obtain smooth direct current for a load circuit, a common iron core, a plurality of coils wound on the core, a plurality of condensers, said coils and condensers being connected alternatively in series, spaced points in said series-connected impedances serving as input terminals for the apparatus, and means for connecting the load circuit to the coils at points of substantially equal potentials for the alternating components, but of unequal potentials for the direct current.

In testimony whereof I affix my signature.

GEORGE B. CROUSE.